United States Patent Office 2,885,555
Patented May 5, 1959

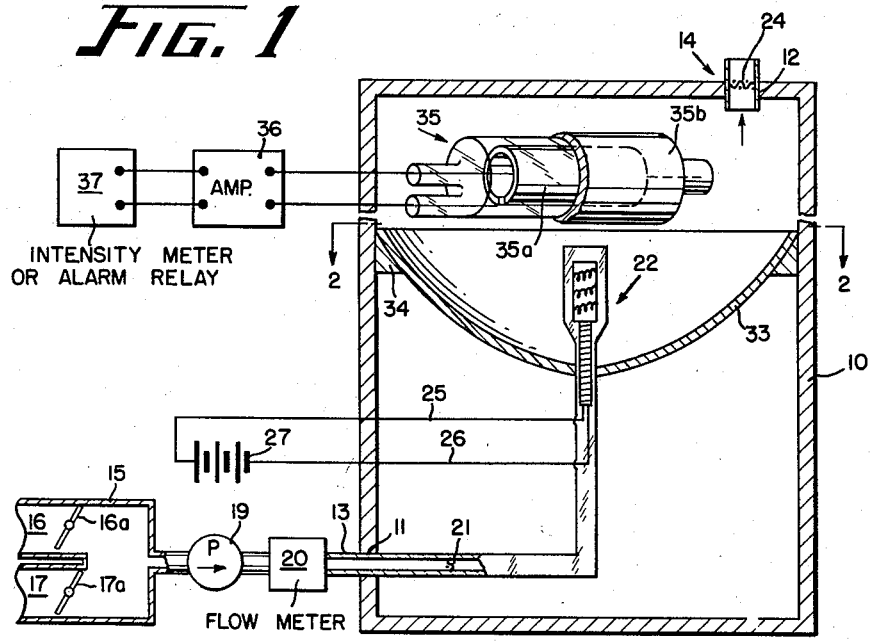
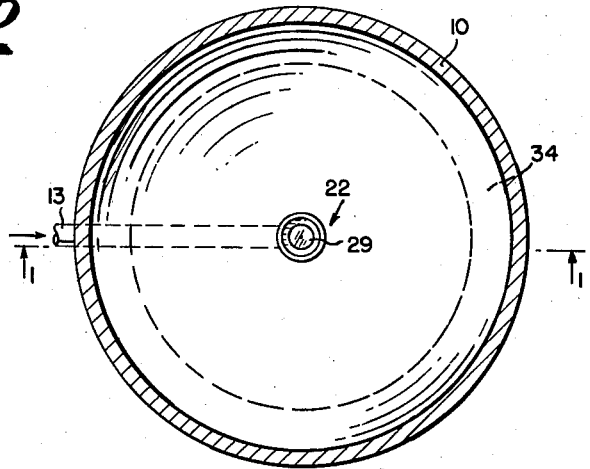
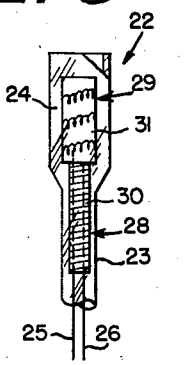

2,885,555
COMBUSTIBLES DETECTOR

Donald R. Blumer, St. Paul, Minn., assignor to Minneapolis-Honeywell Regulator Company, Minneapolis, Minn., a corporation of Delaware Application December 27, 1954, Serial No. 477,790

14 Claims. (Cl. 250—43.5)

The present invention relates to a method and apparatus for detecting the presence of combustibles in gaseous mixtures such as in air or the like, and more particularly to an apparatus for quantitatively and accurately detecting relatively small quantities of combustibles in such gaseous mixtures. For example, one specific modification of the present invention is adapted for the detection of the presence of hydrocarbon vapors in gaseous mixtures containing oxygen in general, and air in particular.

Heretofore, various devices have been proposed for detection of combustibles in gaseous mixtures usually based upon the hot wire resistance bridge principle. However, the invention described herein comprises a hot wire filament adapted to oxidize the combustibles present in the gas mixture and thereby cause radiant energy to be radiated. This system provides a compact, rugged and accurate device which may be set into operation substantially instantaneously with a minimum of adjustments, and which requires relatively modest quantities of power for operation. In this connection, therefore, my apparatus is particularly adapted for continuous operation under conditions where it is desirable to alternately sample the atmosphere of one or several locations, for example, such as several rooms or areas where combustibles may possibly be present in the atmosphere. The apparatus preferably includes a signalling or alarm system which is actuated when the amount of combustibles present in any of the various atmospheres exceeds a certain maximum quantity, for example, 10 or 20% of the lower explosive limit of a hydrocarbon-air mixture. On the other hand, the device may be operated to provide a continuous recording of the amount of combustibles present in a certain location over a given period of time.

Briefly, the apparatus comprises a heated filament which is adapted to oxidize combustibles present in a gas stream, thereby causing radiant energy particularly in the ultraviolet range, to emit therefrom, and a suitable Geiger tube which is sensitive to the ultraviolet radiation emitted from the oxidation of the combustibles in the gas mixture undergoing examination. Means, such as a parabolic reflecting surface, may be provided for concentrating the radiation pattern into a smaller area, this area preferable coinciding with the sensitive area or portion of the Geiger tube. In other words, the Geiger tube is positioned so as to view the filament and thus determine the quantity of ultraviolet radiation which is emitted from the point where the gas sample containing combustibles moves across the filament, while the filament is heated to a temperature sufficient to ignite or oxidize combustibles present in the sample. The Geiger tube is, of course, connected into an appropriate amplifying circuit which is adapted to energize a relay or actuation of other suitable warning or recording means.

Therefore, it is an object of the present invention to provide an improved combustibles detector utilizing means for igniting or oxidizing combustible materials, emitting ultraviolet radiation thereby, and thence measuring the intensity of the radiation so emitted.

It is a further object of the present invention to provide accurate and efficient combustibles detecting means utilizing a heating zone for igniting or oxidizing the combustible material and providing ultraviolet radiation from the oxidation reaction, and thence measuring the intensity of the radiation so emitted with a Geiger tube detector.

It is still a further object of the present invention to provide an improved combustibles detector operating with high efficiency and accuracy.

Other objects will become more apparent to those skilled in the art and by reference to the following specification, claims and drawings in which:

Figure 1 is a vertical sectional view of a detector constructed in accordance with the present invention, taken along the lines and in the direction of the arrows 1—1 of Figure 2, and illustrating the preferred modification of the present invention; and Figure 2 is a horizontal sectional view taken along the lines and in the direction of the arrows 2—2 of Figure 1; and Figure 3 is a detailed view on an enlarged scale showing a filament assembly which is particularly adapted for use in accordance with the present invention.

In accordance with the preferred modification of the present invention, there is illustrated in Figure 1 a combustibles detecting apparatus which comprises a shell or enclosure 10 having ports 11 and 12 in the surface thereof adapted to receive inlet and outlet ducts 13 and 14, respectively. The inlet duct includes a manifold 15 through which gases from various sampling areas are funneled. For example, the individual sampling ducts 16 and 17 are adapted to carry gas samples from various remote areas into the detecting apparatus. These ducts are preferably designed to have a relatively small cross-sectional area in order that the quantity of gas retained therein is as small as possible. A pump 19 is utilized for moving the gas through the system. Downstream from the pump 19 is situated a flow meter 20 in which, for example, a needle valve, regulates the quantity of gas passing through the detector. Still further downstream, there is positioned a flash-back arrestor 21 which may be, for example, in the form of a fine mesh conical screen of about 100 to 200 mesh or a loose wad of fine copper wire. The inlet system terminates in a filament assembly generally designated 22, this system being more fully discussed hereinafter. The outlet 14 permits a flow of gas through the system and also preferably includes a flash-back arrestor 24 across its cross-sectional area. As is the case with the flash-back arrestor in the inlet system, the flash-back arrestor 24 preferably comprises a fine screen of about 100 to 200 mesh or a loose wad of fine copper wire.

Attention is now directed to Figure 3 wherein there is shown a preferred igniter or filament assembly 22 which is adapted to be the terminal portion of the inlet system. This device includes a shell or casing 23 terminating in a zone 24 which is made of a substance adapted to transmit ultraviolet radiation. The upper end of the casing 23 is open to permit free passage of gas therefrom. For example, the envelope portion 23 and 24 may comprise a Vycor or transparent quartz tube which is particularly suited to transmit ultraviolet radiation. Lead wires 25 and 26 carry a supply of electrical energy from a source 27, which may be either a transformer or battery, to the preheater zone 28 and to the ignition zone 29. The preheater 28 includes a plurality of relatively loosely wound high electrical resistance wire coils, 30, while the igniter coil includes a relatively loosely wound spiral of spirally wound wire 31, these preheater and igniter coils being supported on a suitable refractory core or cores. In this connection, the preheater 28 is adapted to heat the gas passing through the zone to a temperature which approaches that necessary for ignition or oxidation of any combustibles which may be included in the sample, In other words, the igniter coil is adapted to heat the gas passing through the zone to a point at which ignition will occur with the resultant emission of ultraviolet radiation. A parabolic reflector 33 is preferably provided in the system in order that ultraviolet radiation may be directed toward the sensitive portion 35A of the Geiger tube 35. In this connection, it is preferable to mount the assembly 22 in a manner which places the ignition zone 24 of the assembly at a point which is somewhat outward from the focal point of the reflector 33 in order that radiation will be concentrated or focused from the ignition zone 24 to the sensitive portion 35A of the Geiger tube 35. Suitable mounting lugs 34 are provided for maintaining the parabolic reflector in preferred relative position within the case or enclosure 10, and the igniter assembly is similarly rigidly supported and attached to the gas inlet line 11 with a suitable T connector through the bottom of which the electrical leads to the igniter coil are taken through a gas tight electrically insulated seal.

The Geiger tube generally designated 35 is mounted in such a manner that it views the point at which oxidation of the combustibles is occurring in the combustion zone of the filament assembly. The tube is preferably protected from overheating due to the heat from the filament and hot gases by means of a jacket 35B or the like with good heat conduction and which is adapted to be cooled by external cooling fins or the like. The Geiger tube 35 is not appreciably sensitive to the infra-red or black body radiation which is generated by the glowing heater coil in the ignition zone of the detector. The Geiger tube detector 35 is energized by a suitable source of electrical potential (not shown), and is electrically connected to an amplifier 36 which is likewise connected to an intensity meter and/or alarm relay 37. The intensity meter or alarm relay 37 is adapted to indicate the intensity of ultraviolet radiation which is being sensed or detected by the Geiger tube 35. For example, if it is desired to operate a relay for sounding an alarm whenever the combustibles concentration becomes too high, a suitable pulse integrating amplifier will be utilized in the system wherein the counted pulses are measured at a rate per unit time such as per second or per minute, and integrating means in the circuit are utilized for determining the average pulse rate or intensity over a given period of time. In this connection, a relay included in the circuit may be set to pull-in at a certain intensity of radiation being energized by, for example, a bridge unbalance which may be set up at any given level of radiation intensity. A microammeter may be used as an intensity meter in this amplifier circuit to indicate the concentration of hydrocarbon or other combustible material in the gas stream.

In operation, a sample of a gas from a remote area or zone is carried through the sampling ducts such as 16 or 17, the sample selection or flow preferably being controlled by the valves shown for example at 16a or 17a. The gas is forced through the system by means of a pump 19, the rate of flow being controlled by a suitable valve in the flow meter 20. During operation, it is desirable to maintain the rate of flow at a predetermined fixed value. After passing through the flow meter 20, the gas is then moved up through the system to the ignition zone 22. Of course, the pump and flow meter may be reversed in their positions in the line. Any combustibles present in the sample are ignited or oxidized on the igniter coil 29 and ultraviolet radiation is emitted in the course of this oxidation reaction. As previously stated, this ultraviolet radiation is picked up or sensed by the Geiger tube 35 and the rate of emission is then recorded by the intensity meter or alarm relay. This device is adapted to sense extremely minute quantities of combustibles or gas which may be present in any given atmosphere undergoing test. Among the combustibles which this device is capable of detecting are the aliphatic hydrocarbons, aromatic hydrocarbons, alcohol, ether vapors, various other organic vapors, and combustible dusts. It has been determined that in the detection of the presence of aliphatics ranging from methane, the principal component of natural gas, up to heavier hydrocarbons such as dodecane, the device may be calibrated to determine the percentage of lower explosive limit concentration universally between various gases with considerable accuracy without the need for recalibration. This will be shown in greater detail hereafter. Since the lower explosive limit of these gases in air, expressed as percent by volume of the hydrocarbon in air, decreases with increasing molecular weight, one achieves substantially the same intensity of ultraviolet radiation at the same relative proportion of the lower explosive limit for each. For example, propane has a lower explosive limit in air of 2.2 volume percent, while heptane has a similar lower explosive limit of about 1.2 volume percent. [Bureau of Mines Bulletin 503 data. "Limits of Flammability of Gases and Vapors," by H. F. Coward and G. W. Jones, U.S. Government Printing Office, Washington (1952).]

According to the above cited report, the lower flammability limit (L.F.L.) in percent of hydrocarbon gases in air for upward propagation of flame is given in the following table. It is seen that the mathematical products of the L.F.L. and the number of carbon atoms as well as the products of the L.F.L. and the molecular weight are in reasonable agreement between the various hydrocarbons.

| Table I | L.F.L., Percent | L.F.L. Percent × No. of C Atoms | L.F.L. Percent × Mol. Wt. |
|---|---|---|---|
| Methane | 5.3 | 5.3×1=5.3 | 5.3× 16.04= 85.0 |
| Ethane | 3.0 | 3.0×2=6.0 | 3.0× 30.07= 90.2 |
| Propane | 2.2 | 2.2×3=6.6 | 2.2× 44.09= 97.0 |
| Butane | 1.9 | 1.9×4=7.6 | 1.9× 58.12=110.4 |
| Pentane | 1.5 | 1.5×5=7.5 | 1.5× 72.15=108.2 |
| Hexane | 1.2 | 1.2×6=7.2 | 1.2× 86.17=103.4 |
| Heptane | 1.2 | 1.2×7=8.4 | 1.2×100.20=120.2 |
| Octane | 1.0 | 1.0×8=8.0 | 1.0×114.23=114.2 |
| Nonane | 0.8 (estd.) | 0.8×9=7.2 | 0.8×128.25=102.6 (estd.) |
| Decane | 0.8 | 0.8×10=8.0 | 0.8×142.28=113.8 |

Since the amount of ultraviolet radiation available from the oxidation of a given combustible molecule will increase as the molecular weight increases, the relative radiation available, for example, from an air mixture including 10% of the lower flammability limit of ethane will be in substantially the same range as that available for a similar mixture of decane. For example, assuming that a given hydrocarbon mixture behaves as an ideal gas, the percent by volume of a given hydrocarbon gas in a mixture is proportional to the molar concentration of that particular gas. Further, the product of the molar concentration of a given gas times its molecular weight is proportional to the actual weight of that gas in a given mixture. From Table I, it is seen that the L.F.L. of a gas decreases as the molecular weight increases. Therefore, for any hydrocarbon out of a given hydrocarbon series, which is contained in a gas mixture in an amount equal to its lower flammability limit, the actual weight of the hydrocarbon will be substantially the same regardless of the specific hydrocarbon present. This feature appears reasonable since a given weight of hydrocarbon should burn with the dissipation of substantially the same quantity of heat and ultraviolet radiation. This relationship becomes more closely related for various hydrocarbons as the molecular weight increases, since the ratio of hydrogen to carbon is more constant between the higher molecular weight hydrocarbon. Of course, for other combustible or explosive mixtures such as alcohol vapors, aromatic vapors, dust and the like, various radiation intensity calibrations must be set up for operation of the apparatus of the present invention under these conditions.

When the present invention is being operated as a combustible dust detector, it will be desirable to shift the position of the pump to the outlet duct in order that any particles which may be retained in the pump will not affect the accuracy of the readings obtained.

In general, while I have shown a certain specific embodiment of my invention, it is to be understood that this is for the purpose of illustration and that my invention is to be limited solely by the scope of the appended claims.

I claim as my invention:

1. Apparatus for detecting the presence of combustibles in a gaseous medium comprising in combination, an ignition chamber including means for moving a gaseous medium through said chamber and ignition means for oxidizing combustibles present in said medium, and detecting means for detecting emission of ultraviolet radiation from said ignition chamber formed in said oxidizing reaction.

2. Apparatus for detecting the presence of hydrocarbon vapors in a gaseous medium comprising in combination, an ignition chamber including means for moving a gaseous medium through said chamber and ignition means for oxidizing hydrocarbons present in said medium, and detecting means for detecting emission of ultraviolet radiation from said ignition chamber formed in said oxidizing reaction.

3. Apparatus for quantitatively detecting the presence of hydrocarbon vapors in a gaseous medium comprising in combination, an ignition chamber including means for moving a gaseous medium through said chamber and ignition means for oxidizing hydrocarbons present in said medium, and detecting means comprising a Geiger tube for quantitatively detecting the rate of emission of ultraviolet radiations from said ignition chamber formed in said oxidizing reaction.

4. Apparatus for quantitatively detecting the presence of hydrocarbon vapors in a gaseous medium comprising in combination, an ignition chamber including means for moving a gaseous mixture through said chamber a preheater zone for heating said mixture, and ignition means for oxidizing combustibles present in said mixture, detecting means comprising a Geiger tube having a zone sensitive to ultraviolet radiation for detecting the rate of emission of ultraviolet radiation from said ignition chamber formed from said oxidizing reaction, and means for concentrating said radiation into the sensitive zone of said Geiger tube.

5. Apparatus for quantitatively determining the presence of combustibles in a gaseous medium comprising an ignition chamber having an inlet and an outlet, ignition means for igniting combustibles included in said medium thereby emitting ultraviolet radiation as said medium passes through said chamber, and a Geiger tube sensitive to radiation in the ultraviolet range positioned to view said ignition zone for detecting emission of ultraviolet radiation from the ignition of said combustibles.

6. Apparatus for quantitatively determining the presence of combustibles in a gaseous medium comprising an ignition chamber having an inlet and an outlet, ignition means in said chamber for oxidizing combustibles included in said medium thereby emitting ultraviolet radiation as said medium passes through said chamber, and means including a Geiger tube sensitive to radiation in the ultraviolet range positioned to view said ignition zone for determining the rate of emission of ultraviolet radiation from the decomposition of combustibles included in said medium.

7. Apparatus for quantitatively determining the presence of hydrocarbons in a gaseous medium comprising an ignition chamber having an inlet port and an outlet port, ignition means for thermally decomposing hydrocarbons included in said medium thereby emitting ultraviolet radiation from said decomposition as said medium passes through said chamber, and means including a Geiger tube sensitive to radiation in the ultraviolet range positioned to view said ignition zone for determining the rate of emission of ultraviolet radiation from the decomposition of said hydrocarbons.

8. Apparatus for detecting hydrocarbons in a gas mixture comprising a chamber having an inlet and an outlet, means for passing said gas mixture through said chamber, an ignition zone in said chamber for oxidizing hydrocarbons present in said mixture including a heated filament and detecting means viewing said filament sensitive to ultraviolet radiation for indicating the emission of ultraviolet radiation from hydrocarbons oxidized in said ignition zone.

9. Apparatus for detecting hydrocarbons in a gas mixture comprising a chamber having an inlet and an outlet, means for passing said gas mixture through said chamber, an ignition zone in said chamber including a heated filament for oxidizing hydrocarbons present in said mixture, and detecting means including a Geiger tube sensitive to ultraviolet radiation and insensitive to infra-red radiation for indicating the rate of emission of ultraviolet radiation from said ignition zone.

10. Apparatus for detecting the presence of combustible substances in a gaseous sample which comprises a chamber having an inlet and an outlet for moving a sample through said chamber, an ignition zone for oxidizing said combustibles while passing through said chamber, and detecting means viewing said ignition zone, said ignition means including a filament adapted to be heated to a temperature sufficient for effecting oxidation of the combustibles in the sample with generation of ultraviolet energy, said detecting means comprising a Geiger tube sensitive to radiation in the ultraviolet range.

11. Apparatus for detecting the presence of hydrocarbons in a gaseous sample including air which comprises a chamber having an inlet and an outlet for passing said sample through said chamber, an ignition zone for igniting said hydrocarbons, and detecting means viewing said zone, said ignition zone including a filament adapted to be heated to a temperature sufficient for effecting ignition of the hydrocarbons with generation of ultraviolet energy, said detecting means comprising a Geiger tube sensitive to radiation in the ultraviolet range.

12. Apparatus for detecting the presence of hydrocarbon vapors in a gaseous medium comprising in combination, an ignition chamber including means for moving said gaseous medium through said chamber and ignition means comprising a heated filament glowing in the infra-red range for oxidizing combustibles present in said medium thereby causing radiant energy of a second range to be dissipated, and detecting means sensitive to radiation in said second range and insensitive to radiation in the infra-red range for detecting emission of radiation of said second range from said ignition chamber.

13. Apparatus for detecting the presence of combustible dusts in a gaseous medium comprising in combination, an ignition chamber including means for moving a gaseous medium through said chamber and ignition means for oxidizing combustible dusts present in said medium, and detecting means for detecting emission of ultraviolet radiation from said ignition chamber formed in said oxidation reaction.

14. Apparatus for detecting the presence of hydrocarbon vapors in a gaseous medium comprising in combination, an ignition chamber including means for moving said gaseous medium therethrough at a substantially constant rate of flow and ignition means for oxidizing combustibles present in said medium thereby generating ultra-violet energy, and detecting means for detecting emission of ultra-violet radiation from said ignition chamber due to the oxidization of said combustibles formed in said oxidation reaction.

References Cited in the file of this patent

UNITED STATES PATENTS

| | | |
|---|---|---|
| 2,507,359 | Weisz | May 9, 1950 |
| 2,561,802 | Klug | July 24, 1951 |
| 2,624,012 | English et al. | Dec. 30, 1952 |